Figure 1:
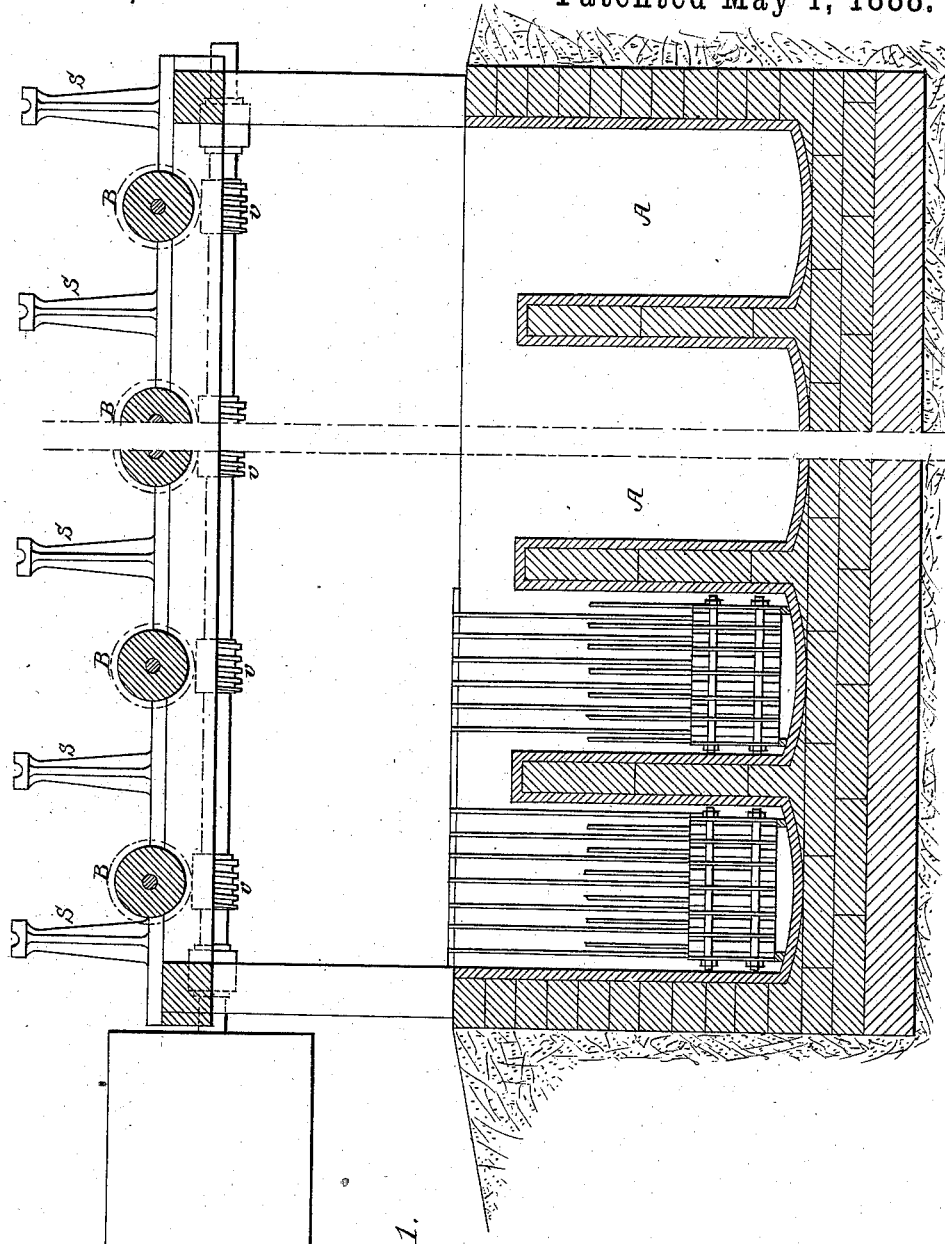

(No Model.) 6 Sheets—Sheet 1.

E. HERMITE.
PROCESS OF BLEACHING.

No. 382,159. Patented May 1, 1888.

Witnesses:
John E. Parker
David S. Williams

Inventor:
Eugene Hermite
by his Attorneys.
Howson & Sons (No Model.) 6 Sheets—Sheet 3.

E. HERMITE.
PROCESS OF BLEACHING.

No. 382,159. Patented May 1, 1888.

Witnesses:
John E. Parker.
David S. Williams.

Inventor:
Eugene Hermite.
by his Attorneys.
Howson & Son (No Model.) 6 Sheets—Sheet 4.

E. HERMITE.
PROCESS OF BLEACHING.

No. 382,159. Patented May 1, 1888.

Witnesses:
John E. Parker
David S. Williams

Inventor:
Eugene Hermite,
by his Attorneys
Howson & Son (No Model.)

6 Sheets—Sheet 5.

E. HERMITE.
PROCESS OF BLEACHING.

No. 382,159. Patented May 1, 1888.

Witnesses:
Henry Bossert.
Harry Drury.

Inventor:
Eugene Hermite.
by his Attorneys,
Howson & Son.

(No Model.)  
6 Sheets—Sheet 6.

E. HERMITE.
PROCESS OF BLEACHING.

No. 382,159. Patented May 1, 1888.

Witnesses:
Henry Bossert.
Harry Drury.

Inventor:
Eugene Hermite.
by his Attorneys.
Howson & Son.

UNITED STATES PATENT OFFICE.

EUGÈNE HERMITE, OF PARIS, FRANCE.

PROCESS OF BLEACHING.

SPECIFICATION forming part of Letters Patent No. 382,159, dated May 1, 1888.

Application filed February 11, 1885. Serial No. 155,601. (No specimens.) Patented in France September 11, 1884, No. 164,230; in Belgium September 13, 1884, No. 66,300; in England October 21, 1884, No. 13,929; in Italy October 23, 1884, No. 17,506; in Germany October 24, 1884, No. 35,549; in Sweden January 10, 1885; in Spain February 28, 1885, No. 6,537; in Norway May 19, 1885, and in Austria-Hungary January 5, 1886, No. 35,217.

*To all whom it may concern:*

Be it known that I, EUGÈNE HERMITE, a citizen of the United States, and a resident of London, England, have invented an Improved Process of Bleaching by Electrolysis, (for which French patent, No. 164,230, dated September 11, 1884; Belgian patent, No. 66,300, dated September 13, 1884; Spanish patent, No. 6,537, dated February 28, 1885; Austro-Hungarian patent, No. 35,217, dated January 5, 1886; German patent, No. 35,549, dated October 24, 1884; British patent, No. 13,929, dated October 21, 1884; Italian patent, No. 17,506, dated October 23, 1884; Norwegian patent, dated May 19, 1885, and Swedish patent, dated January 10, 1885, have been granted,) of which the following is a specification.

I have ascertained by experiment that when an aqueous solution of magnesium-chloride (consisting of five per cent. of magnesium-chloride and ninety-five per cent. of water, for instance,) is electrolyzed in a suitable apparatus, this salt is decomposed at the same time as the water. By the term "magnesium-chloride" I mean the chemical represented by the formula $MgCl_2$. The nascent (*i. e.*, newly-liberated) chlorine of the magnesium-chloride and the nascent oxygen of the water (resulting from the electrolysis) unite at the positive pole and produce an unstable oxygen compound of chlorine of very high bleaching power. The hydrogen and the magnesium go to the negative pole. This last decomposes the water and forms magnesium-oxide, while the hydrogen is disengaged. If in this liquid colored vegetable fibers are introduced, the oxygen compound acts on the coloring-matter, oxidizing it. Chlorine combines with the hydrogen to form hydrochloric acid, which, finding itself in presence of the magnesia in the liquid, combines with it and forms the initial chloride of magnesium. Thus a complete circle of changes goes on, so long as the electric current acts on the solution in presence of coloring-matter. The cycle is a perfect one in which there are four elements—the electric current, chloride of magnesium, the water, and the coloring-matter. Only two of these elements are used up in bleaching the coloring-matter—the electric current, or what is the same, the motive power, and the water. Thus the chloride of magnesium serves over and over again. There is only a simple displacement of molecules, and the chlorine acts as a vehicle to discharge the nascent oxygen on the coloring-matter.

In all cases it is advantageous to add a certain quantity of magnesia to the bath or solution. The solution of electrolyzed chloride of magnesium possesses very great discolorizing power. For example, I have ascertained by experiment that in order to bleach one kilogram of linen thread which has undergone no washing the necessary quantity of chlorine measured chlorometrically is about 11.4 grams, according to the process which I have invented, whereas, in order to bleach the same quantity of washed thread (thread treated with lye) by the ordinary method of treatment with hypochlorite of lime, one hundred grams of chlorine would be required.

When it is considered that the oxygen of the oxygenated compounds invariably combines with the coloring-matter before acting upon the cellulose, it will be evident that by means of my improved process it is possible to bleach without prejudice to the strength or solidity of the textile fibers, it being sufficient to regulate the intensity of the electric current in accordance with the degree of bleaching desired. This is proved by the result of my investigations with regard to the treatment of linen thread, for example, which shows that the waste or loss amounts to only from about six to eight per cent. of the weight of the thread, the loss when the ordinary process is employed being from fourteen to eighteen per cent.

The solution of chloride of magnesium which may be employed in carrying out my invention may have a density of about 1.125 or mark 16° Baumé, having ascertained that the solution of this salt attains its maximum of conducting power at this degree of density. The polarization in open circuit is 2.13 volts. The specific resistance of a solution of chloride of magnesium at 1.125 density at a temperature of 30° centigrade is 6.1 ohms.

I will now proceed to describe by way of example an apparatus which I may employ for treating yarn or threads of flax or linen, hemp, jute, and the like, the same apparatus being also applicable to the bleaching of cotton and other textile fabrics or materials in general, the distance between the rollers and the tanks or vessels being naturally calculated according to the length of the hanks or skeins to be bleached. I may introduce into this apparatus various modifications or improvements which experience may suggest; or I may employ any other arrangement of mechanism suitable for carrying out my improved process.

Figure 1 of the accompanying drawings is a vertical and longitudinal section of the apparatus employed in carrying out my improved bleaching process.

The said apparatus is provided with brick-work troughs or tanks A, separated by brick partitions and cemented over the whole of their internal surface. A wooden frame-work is arranged above these tanks and supports rollers B, which are driven by worm-wheels v. Supports S are arranged between the rollers for the purpose of supporting the latter when being filled or emptied. This arrangement of the upper part of the apparatus resembles that commonly employed in the trade.

Figure 3:
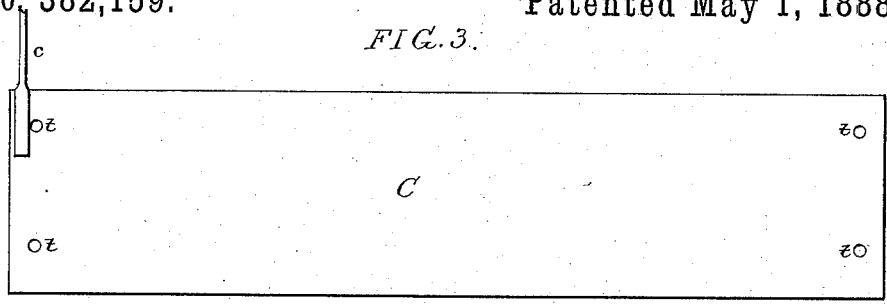
Figure 4:
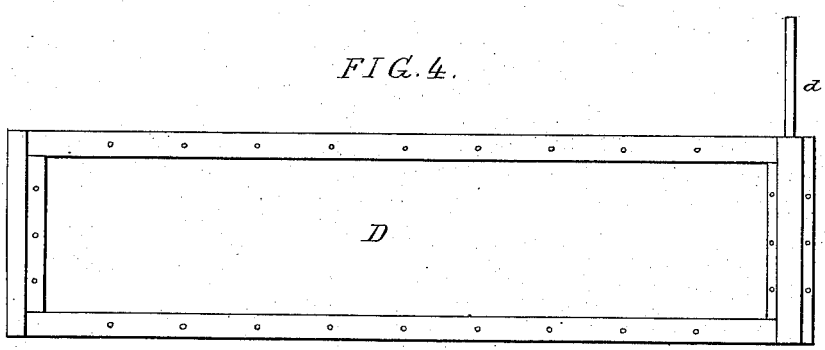
Figure 5:
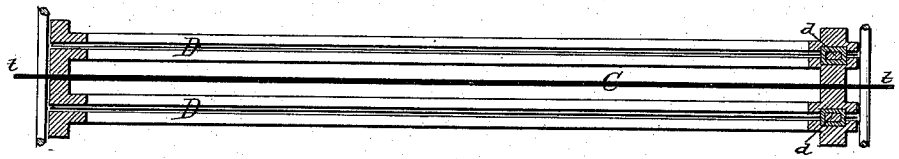
Figure 6:
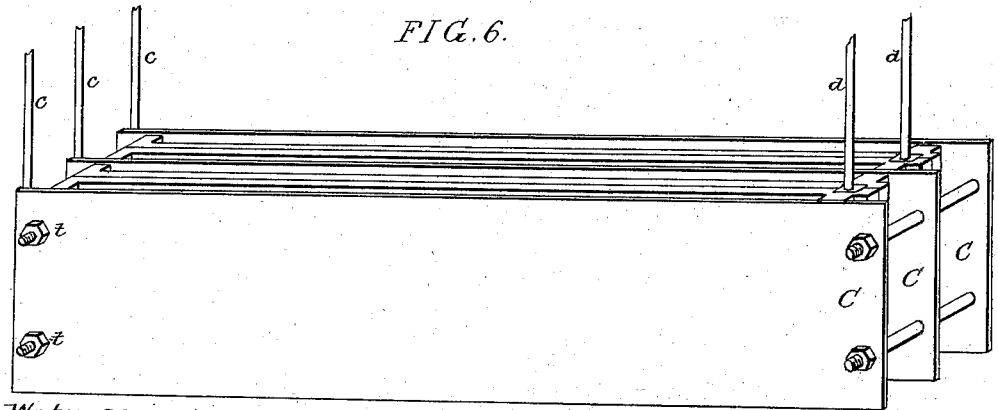
Figure 7:
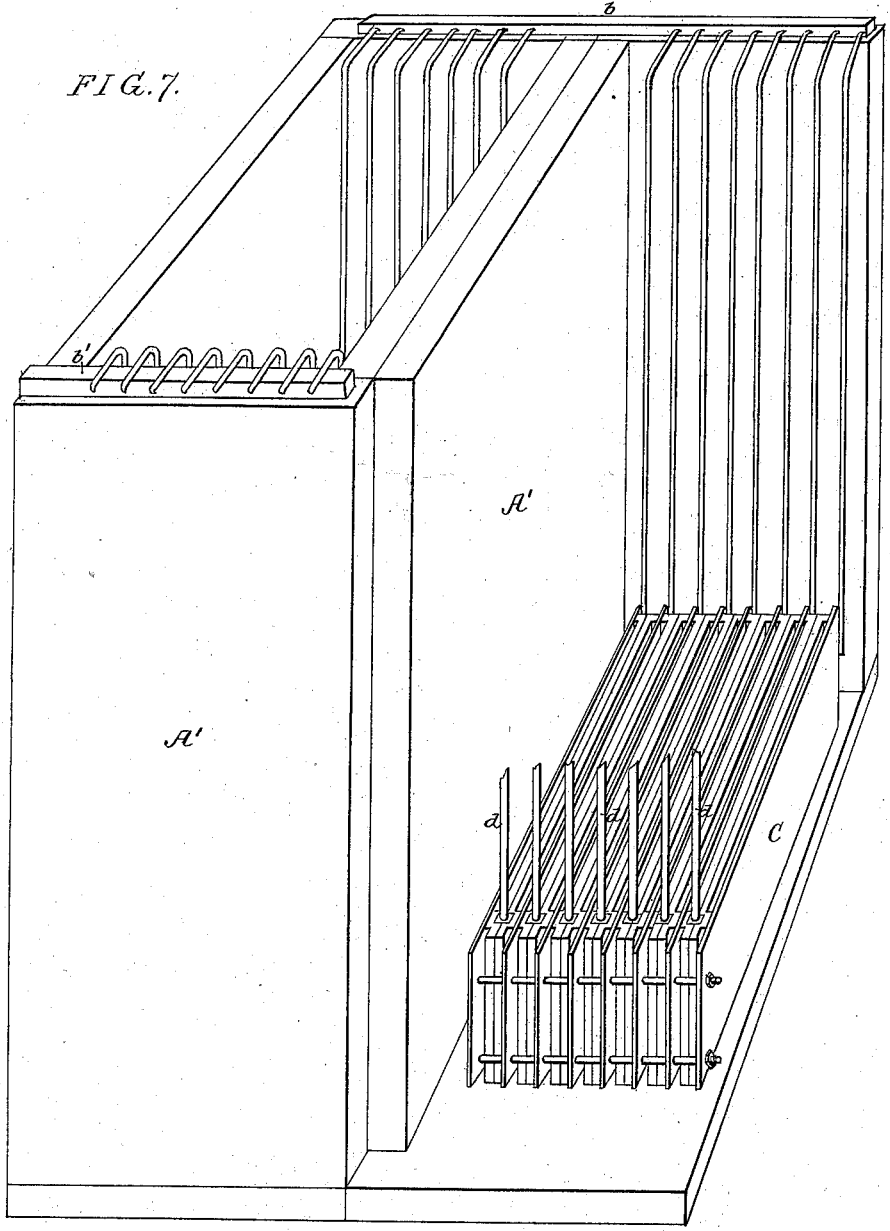

Figs. 3 to 6 represent the electrodes. The negative electrodes, Fig. 3, are composed of zinc plates C, soldered to copper rods c, connected with the main conductor and insulated from the liquid by a varnish or india-rubber covering. Two holes, t, are formed at each extremity of the electrodes for the reception of the bolts. The positive electrodes, Fig. 4, are composed of a plate, D, of platinum or other material capable of resisting the action of the oxygenated compounds of chlorine. These electrodes are carried in wooden frames. (Shown clearly in Figs. 4 and 5.) A copper rod, d, connected with the main conductor is soldered to one extremity of each of these electrodes. Recesses or cavities (see right-hand side of horizontal section, Fig. 5) are formed in the frames around the rods d and are filled up with melted sulphur, which completely insulates and protects the soldered joints, the other parts of the rods being protected by an india-rubber covering. Fig. 7 represents a certain number of these electrodes connected together and forming the sets of electrodes as they are employed in the troughs or vessels A. The number of these electrodes necessarily varies with the intensity of the current, which is to be caused to pass in the bath with a minimum expenditure of electro-motive force.

Figure 2:
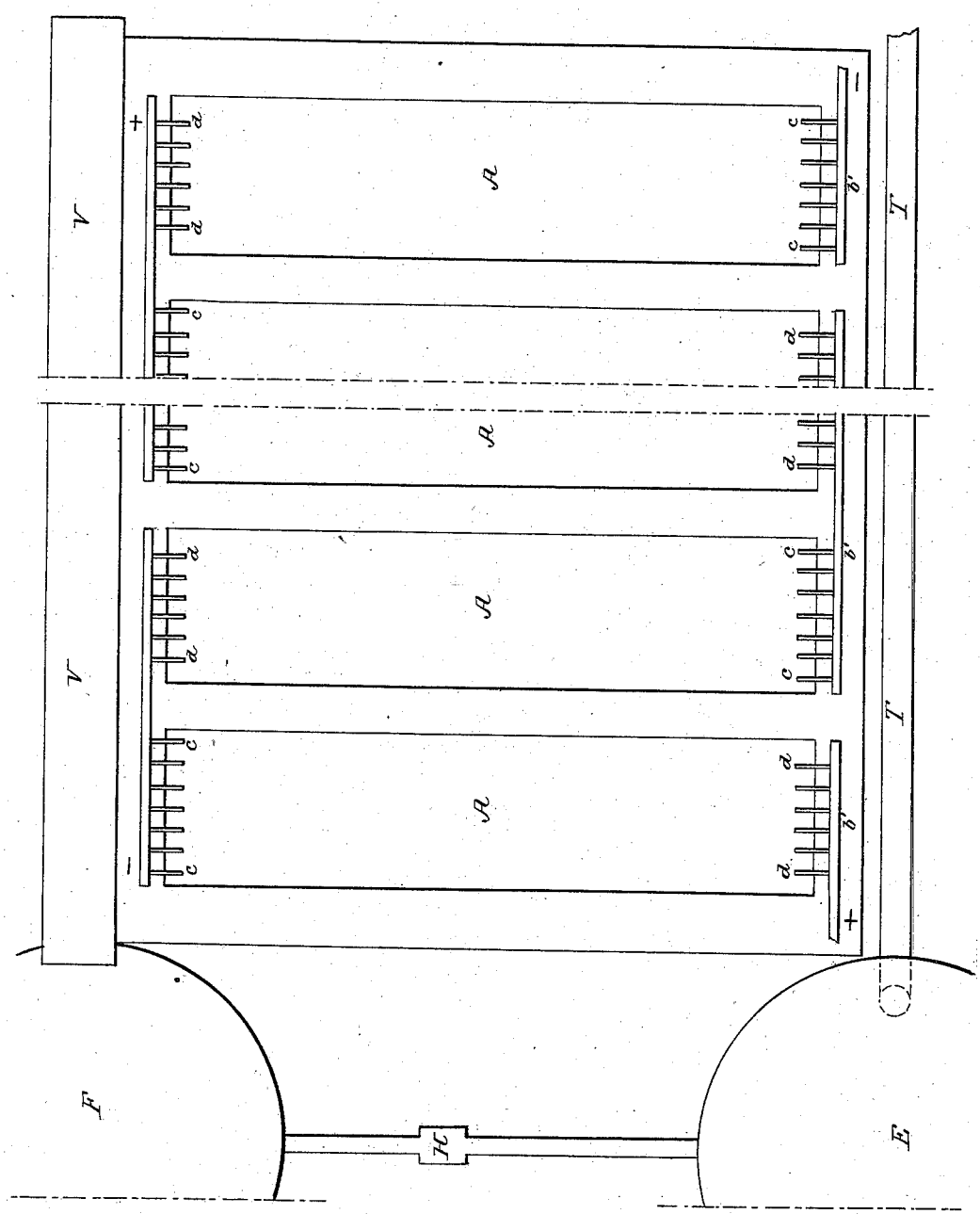

The tanks or troughs A are shown in plan in Fig. 2, together with the arrangement of the conductors, which consist of copper bars b and b', placed upon the edges of the tanks and connected to the rods of the electrodes. The same figure shows a supply-pipe, T, for supplying the troughs A with the solution of chloride of magnesium from a reservoir, E, and an outlet-conduit, V, for carrying the liquid away from the troughs A to a cistern, F, where it is allowed to settle after being used. The clear liquid is elevated from the cistern F to the reservoir E by a pump placed at H.

The process of bleaching with frames or rods for carrying the goods, as practiced in the trade, may be substituted for bleaching with rollers, the arrangement of the apparatus undergoing no alteration except in respect of the height of the troughs; but there should always be as many troughs as there are frames or rollers.

Figure 8:
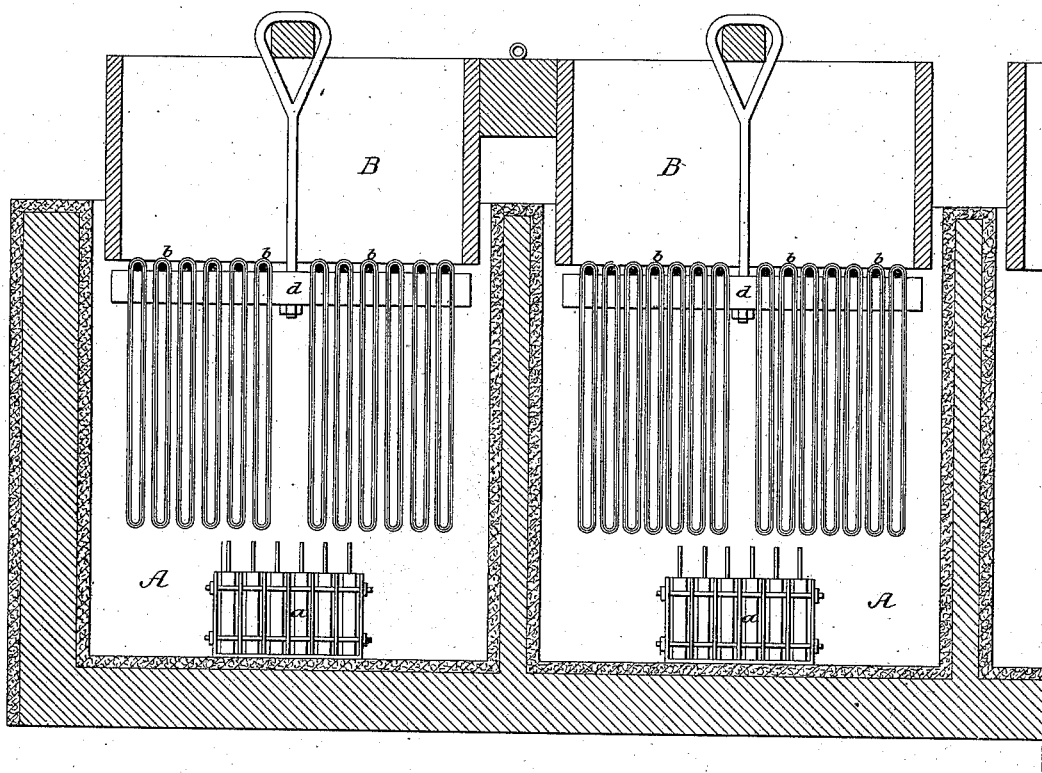
Figure 9:
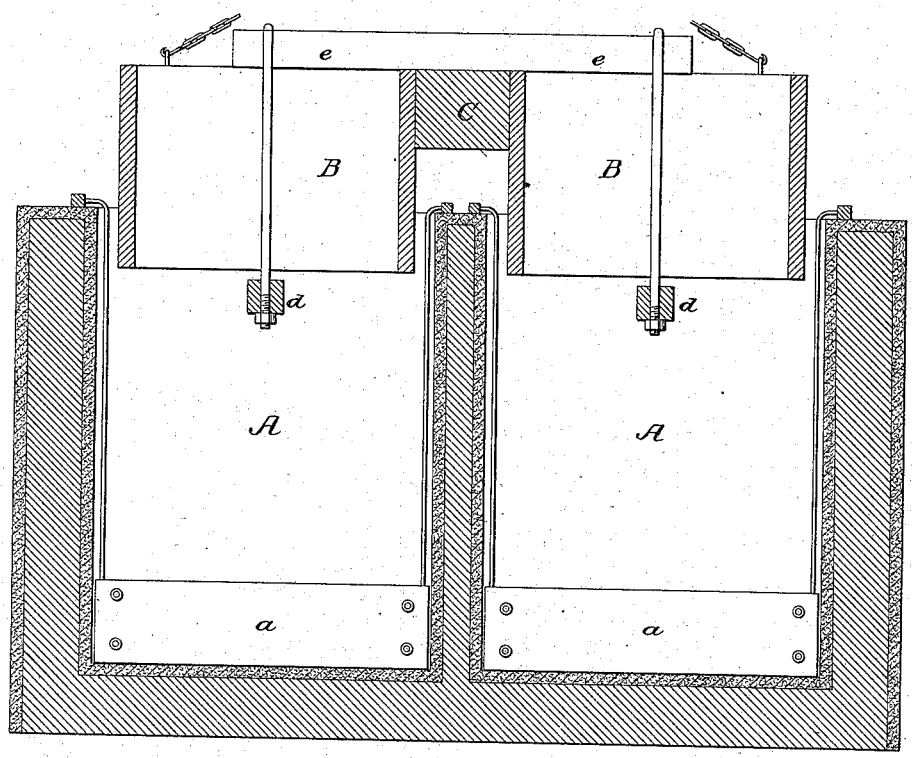
Figure 10:
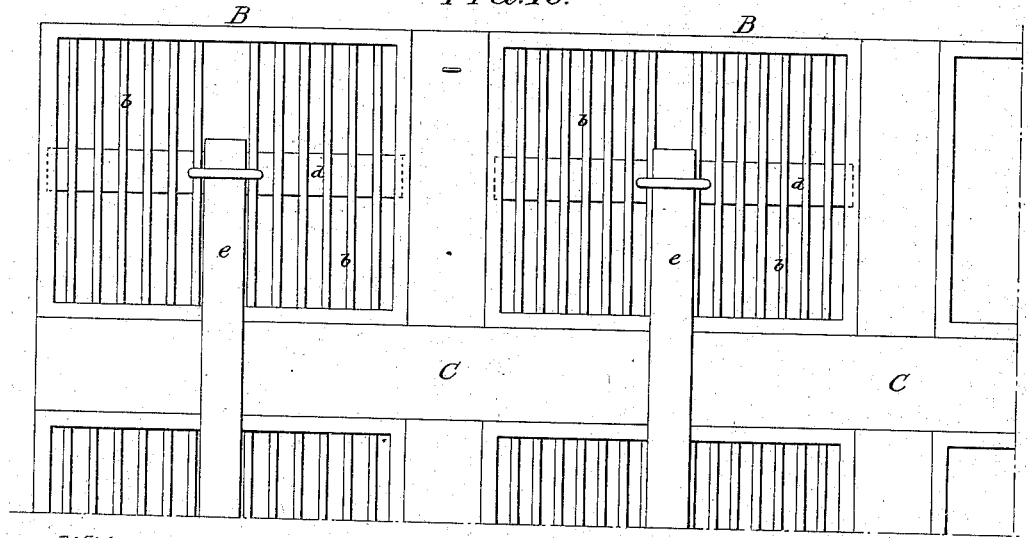

Figs. 8, 9, and 10 illustrate an example of the arrangement to be employed in this case above the compartments or brick-work troughs A, each containing its set of electrodes a. There is provided a frame, B, fitted with rods b, supporting the threads to be treated. These rods are supported at the middle by a cross-bar, d, which in turn is supported by another transverse bar, e, forming part of a framework C, carrying all the frames B. The framework C is suspended by a chain from a pulley, to which an alternating motion is imparted by an eccentric, so as to shake or agitate the hanks in the liquid in the troughs. A crane or hoist arranged at one side serves to remove the frame-work together with all the frames carrying the hanks after each operation and transport them to an adjacent apparatus, where the moisture is drained off.

Fig. 8 represents in horizontal section a portion of an apparatus with troughs, Fig. 9 is a transverse section of the same, and Fig. 10 is a plan of a portion of the frame G.

My process is equally applicable to bleaching fabrics made of linen, cotton, hemp, china-grass, and other fibers, and I may use any mechanical arrangement that appears most advantageous for passing the cloths through the bleaching tanks or troughs.

In dealing with the hanks of yarn or thread, as well as with the textile fabrics, the liquid may be prepared in advance in a series of tanks, the contents of which are collected in a single trough, where the bleaching is effected. The preparing-tanks being arranged in series, any desired number may thus be connected, provided that the electro-motive force at the terminals of the dynamo or generator is sufficient to overcome the resistance and the polarization of the united troughs. In practice I prefer to employ the troughs in batteries or sets of forty arranged in series or tension. A key for reversing the current may be employed with advantage in the circuit, thereby enabling the negative plates to be occasionally connected with the positive pole of the generator for a few moments, thus detaching any deposit that may have formed upon the said plates.

Paper-pulp may be bleached according to my process in three different ways.

In the first case I subject the solution of chloride of magnesium to electrolysis in a series of backs or vats, A', connected in series and arranged as illustrated in Fig. 7. The electrodes in these vats are arranged in the manner hereinbefore described with reference to Fig. 2. When the liquid is electrolyzed, it is drawn off into a large tank by means of cocks provided on each preparing-vat. The liquid thus prepared is employed in the usual manner in the bleaching apparatus; but directly the bleaching is concluded the pulp must be carefully drained and the liquid pumped back into the electrolyzing-tanks, where it is then ready for another operation.

Another way is by effecting the bleaching in bleaching vats or apparatus, in which is placed a set of electrodes arranged as hereinbefore described. The solution of chloride of magnesium is then mixed with the paper-pulp and an electric current of sufficient intensity is caused to pass through the materials. After each bleaching operation the liquid is drawn off for reuse in subsequent operations.

According to a third method, which I find to be advantageous, the first and second methods, hereinbefore described, are combined. The bleaching-vats, provided with electrodes, are arranged in series or tension with a series of preparing troughs or backs, and the liquid from these backs is caused to circulate in the bleaching-vats, care being taken to employ a current possessing the requisite intensity and electro-motive power. In place of the pallets or blades usually employed I prefer to place a helix transversely at one end of the vat, thereby enabling the apparatus to be closed.

One of the chief advantages of my invention is that it enables the most delicate textile materials to be bleached without injuring the fiber.

The electrolyzed liquor of chloride of magnesium, possessing great decolorizing power, acts even when it contains a very small quantity of these chlorine compounds, and, as the production of these chloride compounds can be absolutely controlled or regulated as required by adjusting the electric current, the bleaching action is perfectly under control.

I am aware that it has been heretofore proposed to bleach with the aid of electrolyzed solutions of various chlorides, and that it has been stated that in such operations chlorine has been obtained by the electrolysis of such solutions and the bleaching produced by the action of the chlorine. I believe, however, that I am the first to demonstrate not only that the chloride of magnesium is the best practicable salt which can be used for bleaching by electrolysis, and possesses marked advantages over other salts proposed, but also that in the electric decomposition of the chloride in solution there is a special and peculiar oxygenated compound of chlorine formed at the positive pole, and not merely chlorine gas, as has hitherto been supposed, or hypochlorites, produced by the combination of this chlorine gas (when liberated) with the alkali formed at the negative pole.

As compared with other chlorides which may possibly be used, even though commercially impracticable—such as chloride of sodium—the chloride of magnesium has a much higher bleaching efficiency and requires less power to electrolyze it. This latter fact can be well shown by the following experiment: If chloride of magnesium and chloride of sodium, for instance, be taken together, even with the sodium chloride in excess, and an electric current be passed through them, the chloride of magnesium will be decomposed first. The higher bleaching efficiency of the chloride of magnesium is due in part to the fact that any excess of chloride of magnesium in the solution does not interfere with the bleaching action, whereas with chloride of sodium the bleaching is seriously diminished by the necessary excess of the salt. Furthermore, it is a well-established fact that salts resulting from the combination of oxygenated compounds of chlorine with magnesia possess a greater decolorizing capacity than the corresponding salts of lime, for instance. For example, hypochlorite of magnesia is known to be a much more powerful decolorizing agent than hypochlorite of lime. Moreover, magnesia does not injure the textile materials or fabrics, whereas soda or lime injures them seriously.

It may also be stated that the bleaching-liquor obtained by my process has a bleaching power greater and more rapid than that of ordinary bleaching-powder. It is easy to demonstrate this fact by the following experiment: Take two equal volumes of a fresh solution of bleaching-powder and of the electrolyzed magnesium chloride. These two solutions are to be of the same degree of strength of nascent oxygen, as tested by the arsenious-acid method. Add the same weight of the vegetable fiber to be bleached to each solution, and it is seen that the bleaching proceeds much more rapidly in the electrolyzed solution than in the solution of bleaching-powder; and what is more remarkable is that if the two samples are allowed to bleach to the same degree of whiteness the electrolyzed solution has only lost about half the oxygen strength of that of the bleaching-powder. Thus to obtain the same color there has been required much less oxygen with my process. It has also been verified that the fibers undergo less loss of weight or damage by this method than with ordinary bleaching-powder.

I claim as my invention—

The herein-described process of bleaching, said process consisting in electrolyzing a solution of chloride of magnesium and subjecting the material to be bleached to the action of said electrolyzed solution.

In testimony whereof I have signed my name to this specification in the presence of two subscribing witnesses.

EUGÈNE HERMITE.

Witnesses:
CTE. DIAOUL DE LA ROCHEFOUCAULD,
ALFRED COINY.